United States Patent [19]
Caron

[11] Patent Number: 5,510,707
[45] Date of Patent: Apr. 23, 1996

[54] WHEEL SPEED SENSOR INPUT CIRCUIT WITH SENSOR STATUS DETECTION EMPLOYING A RESISTOR BIASED COMPENSATOR

[75] Inventor: LaVerne A. Caron, Kalamazoo, Mich.

[73] Assignee: Eaton Corporation, Cleveland, Ohio

[21] Appl. No.: 283,967

[22] Filed: Aug. 1, 1994

Related U.S. Application Data

[63] Continuation-in-part of Ser. No. 942,905, Sep. 10, 1992, abandoned.

[51] Int. Cl.$^6$ .............................. G01P 3/48; G01P 3/54; G01B 7/14; G01R 31/06
[52] U.S. Cl. ................... 324/166; 324/173; 324/207.24; 324/546
[58] Field of Search ................................ 324/160, 166, 324/168, 173, 174, 207.11, 207.12, 207.16, 207.24, 225, 537, 546

[56] References Cited

U.S. PATENT DOCUMENTS 5,101,155  3/1992  Oehler et al. ........................ 324/160

Primary Examiner—Walter E. Snow
Attorney, Agent, or Firm—Loren H. Uthoff, Jr.; Howard D. Gordon

[57] ABSTRACT

A wheel speed sensor input circuit with sensor status detection having a comparator with a first input and a second input where both the first and second inputs are connected to a wheel speed sensor having electrical resistance where, when the status of the wheel speed sensor is to be ascertained, the second input is connected to ground through a diode using a switching transistor and the output of the comparator is driven high or low depending on the speed sensor electrical resistance where the output is high if the speed sensor is operational.

3 Claims, 3 Drawing Sheets

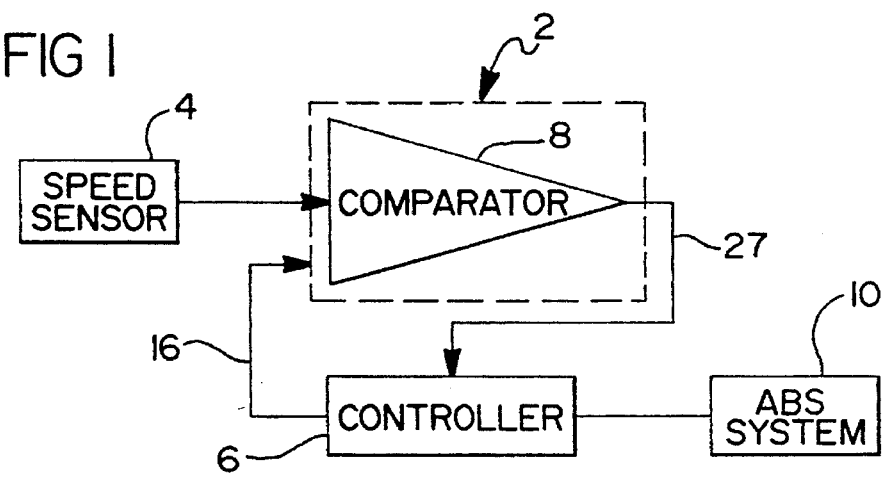
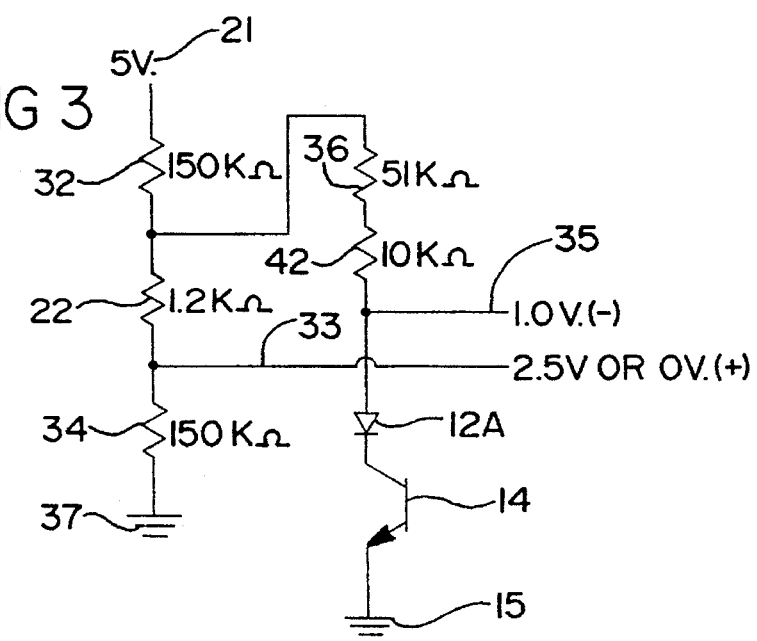
FIG 4
| SPEED SENSOR (4) CONDITION | COMPARATOR (8) OUTPUT | |
|---|---|---|
| | TEST MODE | NORMAL |
| 1. SENSOR OPERATIONAL | HIGH | PULSE |
| 2. SENSOR OPEN OR MISSING OR GROUNDED | LOW | LOW |

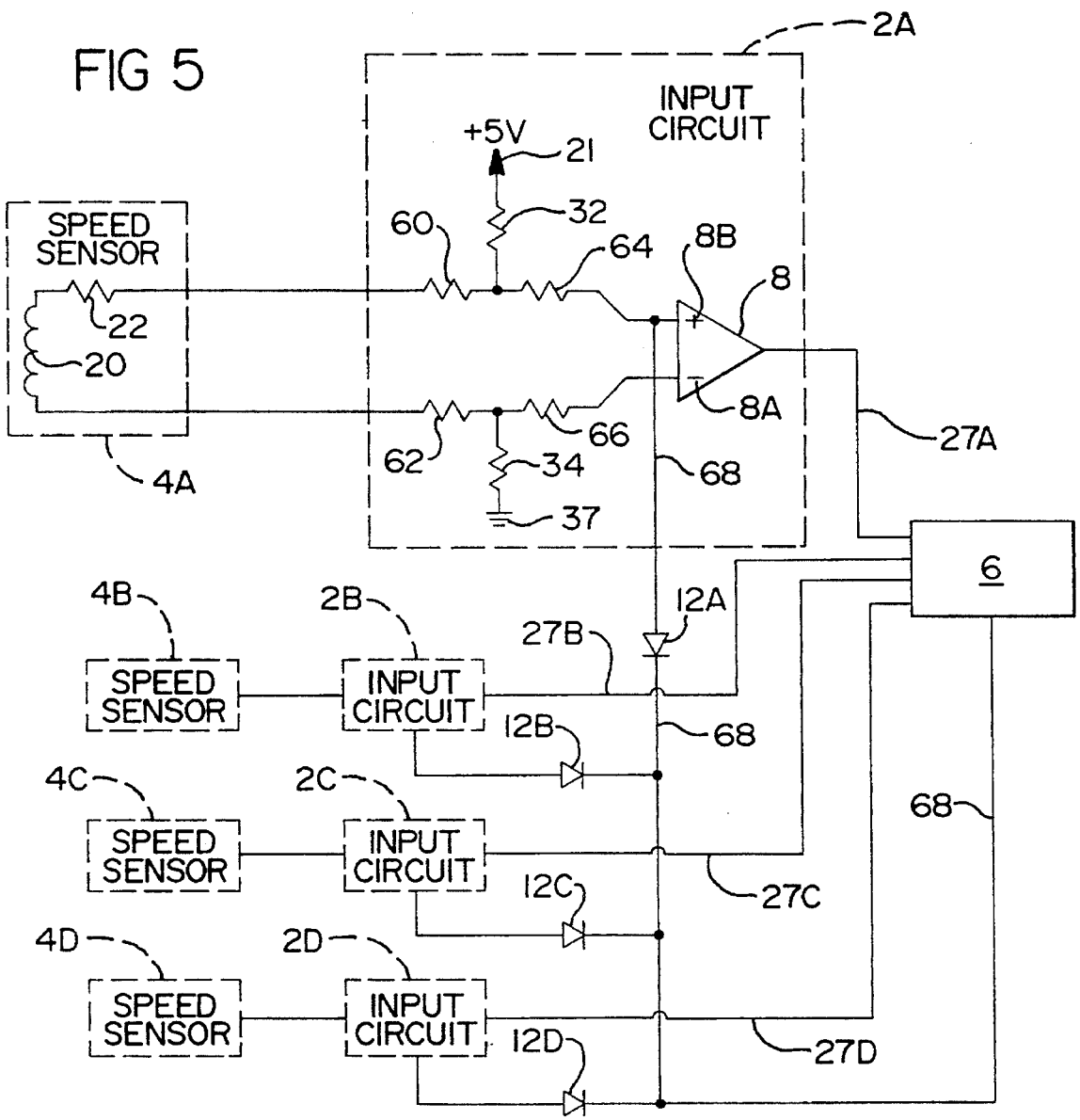

WHEEL SPEED SENSOR INPUT CIRCUIT WITH SENSOR STATUS DETECTION EMPLOYING A RESISTOR BIASED COMPENSATOR

This is a continuation-in-part of application Ser. No. 07/942,905 filed on Sep. 10, 1992 now abandoned.

FIELD OF THE INVENTION

The present invention relates to a wheel speed sensor input circuit with sensor status detection capability. More particularly, the present invention relates to a wheel speed sensor input circuit where the speed sensor resistance forms a portion of the input bias regulating a comparator amplifier whose output is indicative of the operational status of the speed sensor.

BACKGROUND OF THE INVENTION

Wheel speed sensors have been used in a variety of vehicle systems including automatic braking systems (ABS). ABS systems use the signals from the wheel speed sensors to regulate vehicle braking, thus making it imperative that a defective sensor be detected as early as possible. If a wheel speed sensor becomes non-operational or generates an erroneous signal, the system must detect such error and proceed to implement a contingency back-up mode of operation. This is especially important in ABS systems due to the safety related nature of their function.

In prior art methods of detection of the operational state of wheel speed sensors, a microprocessor would be used to look at the output of the sensor after processing by an analog-to-digital converter to confirm that the expected outputs were being generated by the sensors based on the operational state of the vehicle. The problem with this approach is that an unacceptable amount of microprocessor overhead is introduced since the microprocessor must allocate a substantial portion of its operation to processing to look at each individual wheel speed sensor. Another prior art method of detection switches the speed sensors into a check mode. The problem is that in addition to four inputs, this method of status detection requires four outputs to check for individual speed sensor operation requiring additional microprocessor capability.

In normal operation, the microprocessor has to process all wheel speed sensors to arrive at a differential wheel speed signal which is indicative of the amount of wheel slip. Separate wheel speed sensor circuits pre-process the outputs from each wheel speed sensor and then transmit the signals to the microprocessor which calculates the difference between two or more of the speed sensors. This processing can be performed in the wheel speed microprocessor or the ABS microprocessor which then controls the brakes to reduce wheel spin or lock-up. In prior art systems, to detect wheel speed sensor abnormalities, all of the wheel speed sensors had to be connected to separate microprocessor outputs and a like number of switching transistors were required for switching the sensors into a test mode. It would be desirable to reduce the number of outputs required for sensor status detection.

Also, it is difficult to determine the appropriate time to run a detection check since the vehicle operational state is unknown. If the vehicle is stopped, no speed signals are generated and if one wheel is locked, no signal will be generated at that wheel even though the speed sensor is fully operational.

Another prior art method of sensor status detection used is a resistance balancing method where the wheel speed sensor circuit looks for balance between the resistance of the wheel speed sensors (which commonly consist of a multiple turn coil and a core). The problem with this approach is that coil resistance can vary with time or from sensor to sensor due to manufacturing variability, thus requiring complicated resistance balancing schemes to adjust for this variation. In addition to this problem, a similar number of microprocessor outputs are required as was also required with the other prior art methods.

SUMMARY OF THE INVENTION

The present invention overcomes the limitations of the prior art resistance balancing or microprocessor detection systems by using a status detection scheme in a wheel speed input circuit which is insensitive to expected variations in the sensor resistance values and only requires one microprocessor output and one switching transistor for checking any number of speed sensors.

By using the sensor resistance to make-up a portion of a comparator input bias circuit, the comparator output can be made to switch high when the sensor is good and to switch low when the sensor is missing or open. Furthermore, by using a single microprocessor output and single switching transistor, a plurality of sensors can be checked for proper operation by grounding one side of the comparator for each sensor input circuit using the one output bias and one switching transistor. By using the input circuit of the present invention, the microprocessor can very rapidly poll the sensors for an open, shorted, missing or other abnormal resistance state by looking at the output of the comparator of each input circuit where a high output indicates a good sensor and a low output indicates an abnormal sensor.

BRIEF DESCRIPTION OF THE DRAWINGS

FIG. 1 is a block diagram of the speed sensor input circuit of the present invention;

FIG. 3 is a schematic diagram of the speed sensor input circuit of the present invention showing the detection section;

FIG. 4 is a logic output matrix diagram of the comparator output of the present invention.

FIG. 5 is a block diagram of an alternate embodiment of the speed input circuit of the present invention; and FIG. 6 is a logic output matrix diagram of the comparator output of the alternate embodiment shown in FIG. 5.

DETAILED DESCRIPTION OF THE PREFERRED EMBODIMENTS

Figure 2:
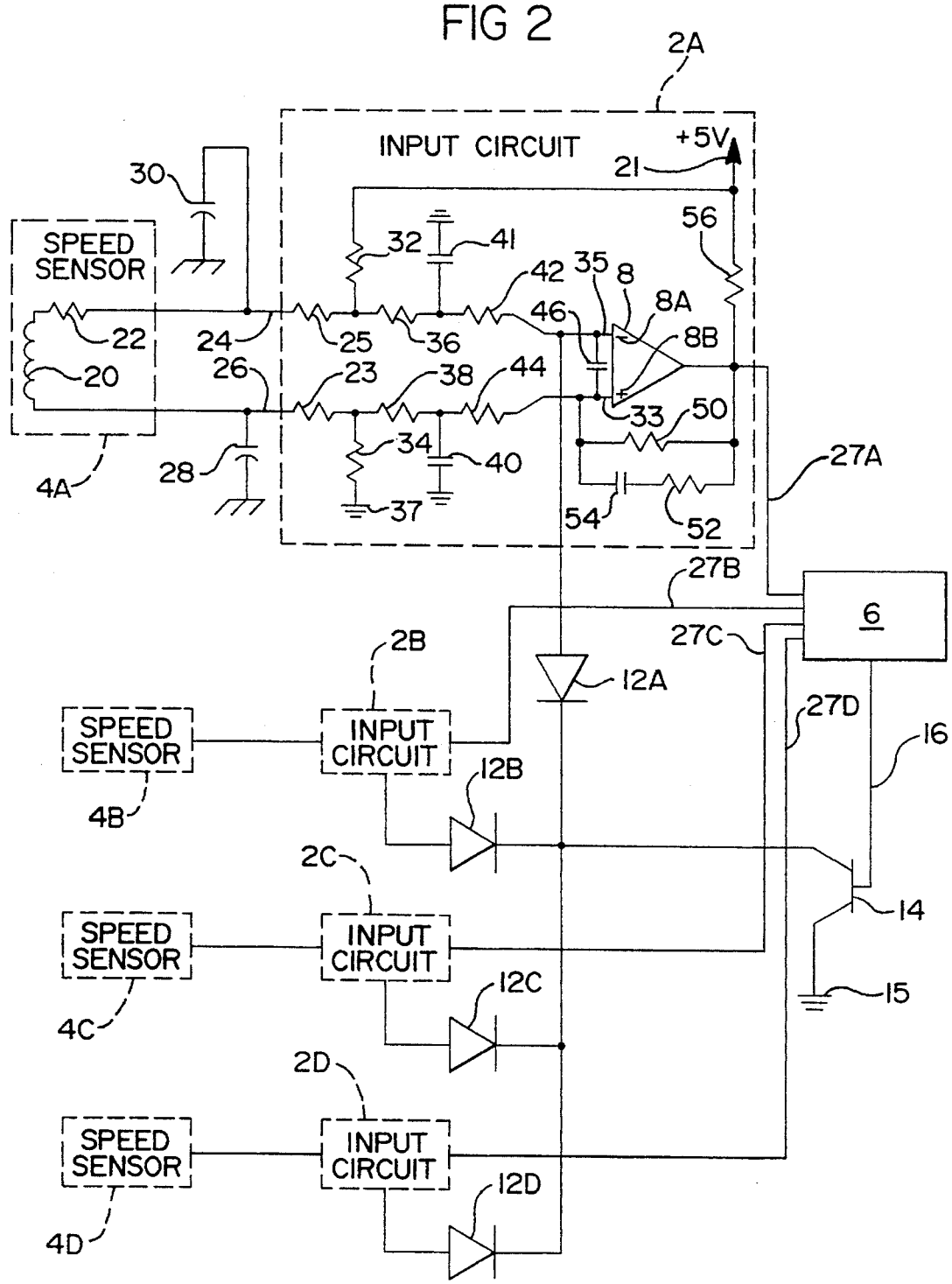
FIG. 2 is a schematic diagram of the speed sensor input circuit of the present invention.

Now referring to the drawings, FIG. 1 shows an operational block diagram of the speed sensor input circuit 2 of the present invention. The input circuit 2 consists of one or more speed sensors 4 which are commonly of the type which employ a coil of wire wound on a magnetic core which changes reluctance when a multiplicity of teeth formed on a turning disc pass in close proximity thereto. This produces a signal which rises and falls in amplitude with each passing of a tooth segment which is then electronically processed to yield a speed signal. The wheel speed sensors 4 are shown as inputs to a vehicle ABS unit 10 where if there is an open circuit in the coil, or the speed sensor 4 is missing, the processing electronics must detect the abnormality and take appropriate fault corrective action such as to disable the ABS unit 10.

The speed sensor 4 consists of at least one speed sensor 4 but can be any number (most commonly four are used for vehicle ABS systems) which are connected to a like number of input circuits 2 of the present invention, each of which contain a comparator amplifier 8. A typical speed sensor 4 has a resistance of 1.2K ohms and an inductance of 1.5 Henrys and the values of the electrical components specified in this disclosure are selected for a speed sensor 4 having these characteristics. Using a similar approach, other speed sensors having different electrical characteristics could be used by selecting the proper components for the input circuit 2. The output of the comparator amplifier 8 is electrically connected to a controller 6 which can be microprocessor based commonly containing pulse width measuring logic which converts the output of the comparators 8 into a digital form for processing.

For purposes of this disclosure, the operation of the comparator 8, which is well known in the industry, consists of two inputs. The first of the inputs is defined as a positive input 8B and a signal is received from line 33. The second input is defined as a negative input 8A and a signal is received from line 35 and is then inverted and added to the signal at the positive input 8B. The result is then amplified such that if the signal at the positive input 8B exceeds the voltage at the negative input 8A by the level of the comparator offset voltage (typically less than 10 mV) the output of the comparator 8 is driven to a high voltage, and if not, the output 27A of the comparator 8 is driven to a low voltage.

The controller 6 includes control logic and is shown connected to an ABS unit 10 for controlling the degree of application of the vehicle's brakes based on the output of the speed sensors 4 as amplified and processed through the input circuit 2 containing the comparator amplifier 8.

The present invention uses the resistance of the speed sensor 4 selected for checking by the controller 6 in conjunction with other resistors to control the bias of the comparator amplifier 8 such that if the sensor has a very high resistance due to a defect or is missing, the comparator amplifier 8 will be driven low and the controller 6 will then interpret this low signal as indicative of a non-operational speed sensor 4 and disable the ABS unit 10 and/or take other appropriate action such as illuminating a warning light to signal the operator of the problem.

If the speed sensor 4 whose operational state is being tested is normal, the resistance of the speed sensor 4 will cooperate with the other fixed resistance elements contained in the input circuit 2 to drive the output of the comparator amplifier 8 to a high level which is interpreted by the controller 6 as an operational speed sensor 4.

Now, to more definitively describe the speed sensor input circuit 2 of the present invention, reference is made to the electronic schematic as shown in FIG. 2. Four speed sensors 4A, 4B, 4C and 4D are shown all having output lines and passive characteristics such as coil resistance 22 and coil inductance 20 as shown for speed sensor 4A. The input circuit 2 of the present invention requires that the speed sensor 4 have a resistance characteristic. Also a like number of output lines 24 and 26 for each of the speed sensors 4A, 4B, 4C and 4D, are then connected to individual speed sensor input circuits 2A, 2B, 2C and 2D. Any number of speed sensors 4 could be used having a like number of speed sensor input circuits 2 and diodes 12.

A switching transistor 14 is controlled by the controller 6 and is connected to the negative side of each of the comparator amplifiers 8 after passing through diodes 12A, 12B, 12C and 12D. The other side of the switching transistor 14 is connected to electrical ground. Any number of wheel speed sensors 4 could be tested as each would have its own input circuit 2 and connection diode 12. Only one switching transistor 14 is needed as its activation by the controller 6 ties all of the connection diodes 12 to ground sending the system into the test mode. Circuit elements 46, 50, 52, 54 and 56 are those commonly found in prior art comparator circuits.

Referring to FIG. 2, during normal operation when the vehicle is in motion, a vehicle speed value is developed by the controller 6 logic. Essentially this value is the highest speed read from all available speed sensors 4A,4B,4C,4D provided that this highest reading is not significantly greater than the majority of the other speed sensor 4 readings. All speed sensor 4 readings are compared against this vehicle speed reading and speed sensors 4 in substantial variance are logged as failed. (If only one sensor is failed, a substitute speed is usually used in its place). Broad limits are needed for this check as it is performed during ABS 10 operation during which wheel speeds may be quite variable.

When the vehicle is not moving, the controller 6 determines that there are no pulses being generated at any speed sensor 4 circuit and the continuity test is activated by turning on transistor 14. (Note the anodes of the diodes 12A, 12B, 12C, and 12D may be directly connected to the controller 6 input/output port if it has an appropriate output stage, typically CMOS). When there is no pulse activity and transistor 14 is "on", all comparators 8 will be forced high unless the sensor is 1) high in resistance or open or 2) either end of the speed sensor 4 is shorted to ground. In these cases, the comparator 8 output will be low (logic zero).

When the wheel speed sensors 4A, 4B, 4C or 4D need checking for operational status, the controller 6 closes the switching transistor 14 so that each of the input circuits 2A, 2B, 2C and 2D operationally can be individually represented by the electrical schematic shown in FIG. 3. There is a speed sensor input circuit 2 for each of the wheel speed sensors 4 which each have an output connected to the controller 6.

Referring to FIG. 3, a reference voltage 21 is supplied to resistors 32 and 36. If the speed sensor 4 is present, then resistor 22 is present and a voltage of approximately 2.5 volts is generated on line 33 due to the voltage drop from the reference voltage 21 which is shown as 5.0 VDC through resistor 32 and the speed sensor resistance 22. Other supply reference voltages could be used and the resulting circuit voltage would correspondingly change. The value of resistors 32 and 34 should be much higher in value than that of the wheel speed sensor resistance represented by resistor 22 (on the order of 100 times as large). If the speed sensor 4 is missing or a wire is broken, the resistance goes to infinity and the voltage on line 33 goes to ground 37.

The voltage generated on line 35 is approximately 1.0 volts due to the voltage drop across diode 12A and transistor 14 collector emitter junction. Line 33 is connected to the positive input to the comparator amplifier 8 and line 35 is connected to the negative input to the comparator amplifier 8.

In normal operation the speed sensor 4 generates a series of voltage pulses which represent the rotational speed of a vehicle wheel. These pulses are transmitted to the input circuit 2 through line 24 and 26 passing through the various passive electrical components such as capacitors 28, 30, 40 and 46 and resistors 32, 34, 42 and 44 eventually reaching comparator amplifier 8 where the pulses are processed and then transmitted to the controller 6 which contains pulse width measurement circuitry.

The outputs of diodes 12A, 12B, 12C and 12D for each of speed sensors 4A, 4B, 4C and 4D respectively are all tied to the switching transistor 14 such that they are connected to ground when the switching transistor is turned on by the controller 6 through the test line 16.

To check for the operational status of all the speed sensors, the controller 6 outputs a signal on test line 16 to cause the switching transistor 14 to turn on and tie line 35 of all of the speed sensors 4 to ground 15 thereby generating approximately 1.0 volts on line 35. The controller 6 then looks at each of the output lines 27 from the comparator amplifiers 8 and if they are high then the speed sensor has proper continuity. If the sensor is open or missing, the voltage on line 33 will be at approximately ground and the comparator output line 27 will be low. In this manner, only one microprocessor output line 16, and only one switching transistor 14 is needed to test all of the speed sensors 4 present.

FIG. 4 is a logic block diagram which illustrates the result of the output of the comparator amplifier 8 when the input circuit 2 is in the test mode when switching transistor 14 is activated by the controller 6 thereby grounding all of the coupling diodes 12 and pulling all of the negative input lines to each of the comparator amplifiers 8 to approximately 1.0 volts. If the speed sensor is operational, the positive input line 33 is at a level of approximately 2.5 volts. If the speed sensor is open, shorted or missing, the positive input line 33 is held at approximately electrical ground. Thus, referring to FIG. 4, the output of the comparator amplifier 8 is high when the speed sensor 4 is operational and goes low when the speed sensor 4 is non-operational.

Referring to Table 1, the values of the various electrical components are designated for assembly of the input circuit 2 based on a speed sensor 4 having electrical characteristics of a resistance 22 of 1.2K ohms and an inductance 20 of 1.5 Henrys. Other components can be substituted to give an equivalent result.

TABLE 1

| Reference Number | Type | Value/Designation |
| --- | --- | --- |
| 12A-D | Diodes | MMAD1105 |
| 14 | Transistor | 2N4401 |
| 23,25 | Resistors | 470 ohms |
| 28,30 | Capacitors | .015 µFd, 200 V |
| 32,34 | Resistors | 150 K 1% |
| 36,38 | Resistors | 47 K |
| 40,41 | Capacitors | .047 µFd |
| 42,44 | Resistors | 10 K |
| 46 | Capacitor | .001 µFd |
| 8 | Comparator/Amplifier | LM2901 |
| 50 | Resistor | 2.0 Meg |
| 52 | Resistor | 47 K |
| 54 | Capacitor | .001 µFd |
| 56 | Resistor | 5.1 K |

Now referring to FIG. 5, an alternate preferred embodiment is shown which adds more DC hysteresis by inventing the polarity of the comparator 8 as compared to that shown in FIG. 2. Also, the switching transistor 14 has been eliminated in the detection circuit. To simplify the schematic, the components required for electromagnetic compatibility and over voltage protection have been deleted for clarity. These components are disclosed in FIG. 2 and can be easily incorporated into the circuit of FIG. 5 by one skilled in the art.

Referring to Table 2, the values of the various electrical components are designated for assembly of the circuit disclosed in FIG. 5. The circuit component values are based on a speed sensor 4 having electrical characteristics of a resistance 22 of approximately 1.2K ohms and an inductance 20 of approximately 1.5 Henrys. Other components can be substituted to give an equivalent result.

TABLE 2

| Reference Number | Type | Value/Designation |
| --- | --- | --- |
| 8 | Comparator/Amp | LM2901 |
| 12A-D | Diodes | MMAD1105 |
| 32,34 | Resistors | 150 K 1% |
| 60,62 | Resistors | 500 ohms |
| 64,66 | Resistors | LM2901 |

Unlike prior art circuits, the test circuit of the present invention as shown in FIG. 5 does not involve any sensitivity adjustment, it simply introduces a method of continuity detection. When in the test mode, only the resistance of the speed sensors 4A–D is of importance. At the time the continuity test is made, the controller 6 (which is usually a microprocessor) verifies that no signal is being generated by the speed sensors 4A–D. Any detected resistance of any one of the speed sensors 4A–D that falls between 0 and approximately 40K ohms will generate a logic zero (low) at the comparator 8 and indicates an acceptable continuity to the controller 6. Typical speed sensors 4A–D have a resistance of about 1K ohm, so the range of acceptable continuity is comparatively large and false failure indications are minimized.

The speed sensors 4A–D are biased towards the center of their respective comparator 8 input ranges with, for example, the use of only a three element string consisting of two resistors 32 and 34 and the speed sensor's 4A internal resistance 22. It is important that the speed sensors 4A–D are biased toward the center of the operating range.

Two 500 ohm input resistors 60 and 62 are used to allow the reliable detection of when one or the other side of a speed sensor, for example, sensor 4A is shorted to ground. Actually only resistor 60 is needed and resistor 62 is placed in the circuit to make the input circuitry symmetrical. All references to speed sensor 4A apply equally to speed sensors 4B–O and visa-versa. Note that the transistor 14 shown in FIG. 2 has been eliminated with no loss in detection capability. Note also that the diodes 12A–D have been retained and are necessary to provide a voltage greater than zero during test modes when any one of the speed sensors 4A–D is open and assures proper failure detection under these conditions.

FIG. 6 is a table showing the operational characteristics of the wheel speed input circuit of the present invention. When the speed sensors 4A–D are in a normal operating state and the vehicle is at rest, the comparator 8 will generate a low output indicating that the tested speed sensors 4A–D are operational. If any of the speed sensors 4A–D are grounded or open, the comparator 8 will output a high signal which is sent to the controller 6 which then takes appropriate action.

It will be appreciated by those of ordinary skill in the art that many variations in the foregoing preferred embodiment are possible while remaining within the scope of the present invention. Thus, the present invention should not be considered limited in the preferred embodiments or the specific choices of materials, configurations, applications or ranges of parameters employed therein.

What is claimed is:

1. A vehicle wheel speed detection circuit comprising:
speed sensing means for generating an electrical speed signal indicative of a speed of rotation, said speed sensing means having a first output connector and a second output connector; comparator means having a first input electrically connected to said first output connector and a second input electrically connected to said second output connector for receiving said speed signal, said comparator means amplifying a difference between said signal first and second inputs and generating a comparator output signal on a comparator output line based thereon;

a nonswitchable resistor electrically connected between said comparator output line and said first input where a resistance value of said resistor is substantially greater than a resistance value of said speed sensing means as measured between said first and second output connectors; and switching means for electrically connecting said second input to an electrical ground when in a test mode where said comparator means drives said comparator output signal to a high state when said speed sensing means is operational and said comparator means drives said comparator output signal to a low state when said speed sensing means is non-operational.

2. The vehicle wheel speed detection circuit of claim 1, further comprising a diode electrically connected between said second input and said switching means, said diode also being electrically connected to said electrical ground when in said test mode.

3. The vehicle wheel speed detection circuit of claim 1, further comprising a control means connected to said switching means for controlling the state of said switching means and connected to said comparator output line for interpreting said comparator output signal.

* * * * *